United States Patent

Hano

(10) Patent No.: US 12,375,014 B2
(45) Date of Patent: Jul. 29, 2025

(54) BRUSHLESS MOTOR CONTROL DEVICE AND BRUSHLESS MOTOR CONTROL METHOD

(71) Applicant: Hitachi Astemo, Ltd., Hitachinaka (JP)

(72) Inventor: Masaki Hano, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 148 days.

(21) Appl. No.: 18/023,786

(22) PCT Filed: Sep. 1, 2021

(86) PCT No.: PCT/JP2021/032075
§ 371 (c)(1),
(2) Date: Feb. 28, 2023

(87) PCT Pub. No.: WO2022/050296
PCT Pub. Date: Mar. 10, 2022

(65) Prior Publication Data
US 2023/0327586 A1 Oct. 12, 2023

(30) Foreign Application Priority Data
Sep. 3, 2020 (JP) .................... 2020-148257

(51) Int. Cl.
*H02P 6/182* (2016.01)
*H02P 6/08* (2016.01)
(Continued)

(52) U.S. Cl.
CPC ............... *H02P 6/085* (2013.01); *H02P 6/18* (2013.01); *H02P 6/22* (2013.01)

(58) Field of Classification Search
CPC .. H02P 6/085; H02P 6/182; H02P 6/18; H02P 6/30; H02P 6/22
(Continued)

(56) References Cited

U.S. PATENT DOCUMENTS

2009/0200971 A1 8/2009 Iwaji et al.
2012/0268052 A1* 10/2012 Nam ................ H02P 6/182
318/494
(Continued)

FOREIGN PATENT DOCUMENTS

JP 2009-189176 A 8/2009

OTHER PUBLICATIONS

International Preliminary Report on Patentability (PCT/IB/326, PCT/IB/338 & PCT/IB/373) issued in PCT Application No. PCT/JP2021/032075 dated Mar. 16, 2023, Including English translation of document C2 (Japanese-language Written Opinion (PCT/ISA/237), filed on Feb. 28, 2023) (10 pages).
(Continued)

*Primary Examiner* — Gabriel Agared
(74) *Attorney, Agent, or Firm* — Crowell & Moring LLP (57) ABSTRACT

There are provided a brushless motor control device and a brushless motor control method that can suppress occurrence of step-out caused by reverse rotation, in low-speed sensorless control of a brushless motor. The brushless motor control device applies, to a brushless motor, a positive pulse generating torque in a rotation direction of the brushless motor and a negative pulse generating torque in a reverse rotation direction, and detects a rotation direction by using a magnetic saturation voltage generated when the positive and negative pulses are applied. The control device sets an upper limit value to a motor application duty represented by a value obtained by subtracting an application duty of the negative pulse from an application duty of the positive pulse.

17 Claims, 8 Drawing Sheets

(51) Int. Cl.
*H02P 6/18*     (2016.01)
*H02P 6/22*     (2006.01)
*H02P 6/30*     (2016.01)

(58) Field of Classification Search
USPC .................................................. 318/400.26
See application file for complete search history.

(56) References Cited

U.S. PATENT DOCUMENTS

2016/0233803 A1\*  8/2016  Hano ....................... H02P 6/20
2018/0254722 A1\*  9/2018  Umetsu .................. H02P 6/182
2020/0235683 A1\*  7/2020  Suzuki ..................... H02P 6/06

OTHER PUBLICATIONS

International Search Report (PCT/ISA/210) issued in PCT Application No. PCT/JP2021/032075 dated Oct. 26, 2021 with English translation (four (4) pages).
Japanese-language Written Opinion (PCT/ISA/237) issued in PCT Application No. PCT/JP2021/032075 dated Oct. 26, 2021 (three (3) pages).

\* cited by examiner

BRUSHLESS MOTOR CONTROL DEVICE AND BRUSHLESS MOTOR CONTROL METHOD

TECHNICAL FIELD

The present invention relates to a control device and a control method for a brushless motor used, for example, for an electric water pump used in a cooling system for a vehicle internal combustion engine or for a next-generation brushless electric VTC (Valve Timing Control) system.

BACKGROUND ART

In recent years, there has been an increased need for in-vehicle brushless motors without any sensor, instead of those with sensors, to achieve cost reduction and improvement in mountability. Furthermore, this type of brushless motor is required to be driven at extremely low rotation rates including stoppage.

For example, Patent Document 1 discloses low-speed sensorless control using a magnetic saturation voltage. In the low-speed sensorless control, an electromotive force generated in an open phase of the 120-degree energization is detected based on non-linearity of motor magnetic saturation characteristics, and a rotor angle (N-pole center position) is estimated.

REFERENCE DOCUMENT LIST

Patent Document

Patent Document 1: JP 2009-189176 A

SUMMARY OF THE INVENTION

Problem to be Solved by the Invention

At an extremely low rotation rate, it is assumed that rotation in a direction opposite to a desired rotation direction (reverse rotation) occurs due to load torque or the like, and thus control in which rotation is detected only in one direction causes step-out. To prevent step-out during the extremely low rotation rate, it is necessary to limit a duty width Dw necessary for acquisition of the magnetic saturation voltage so as to satisfy "Dmin≤Dw≤Dmax". Here, Dmin is a minimum duty, and Dmax is a maximum duty.

However, when a motor application duty is increased, a reverse rotation detection duty width cannot be secured. Therefore, in a case in which reverse rotation occurs, the reverse rotation may not be detected, and step-out may occur.

An object of the present invention, which has been made in consideration of the above-described circumstances, is to provide a brushless motor control device and a brushless motor control method that can suppress occurrence of step-out caused by reverse rotation in low-speed sensorless control.

Means for Solving the Problem

According to an aspect of the present invention, there are provided a brushless motor control device and a brushless motor control method. The brushless motor control device applies, to a brushless motor, a positive pulse generating torque in a rotation direction of the brushless motor and a negative pulse generating torque in a reverse rotation direction, and detects a rotation direction by using a magnetic saturation voltage generated when the positive and negative pulses are applied. The brushless motor control device sets an upper limit value to a motor application duty represented by a value obtained by subtracting an application duty of the negative pulse, from an application duty of the positive pulse.

Effects of the Invention

According to the present invention, a duty at which detection and non-detection of reverse rotation of the brushless motor are switched is set, and in a case in which torque exceeding torque when the motor application duty is greater than or equal to the set duty is necessary, the motor application duty is determined based on a rotation speed. Therefore, even if reverse rotation occurs in the low-speed sensorless control, occurrence of step-out can be suppressed.

MODE FOR CARRYING OUT THE INVENTION

An embodiment of the present invention will be described below with reference to drawings.

Figure 1:
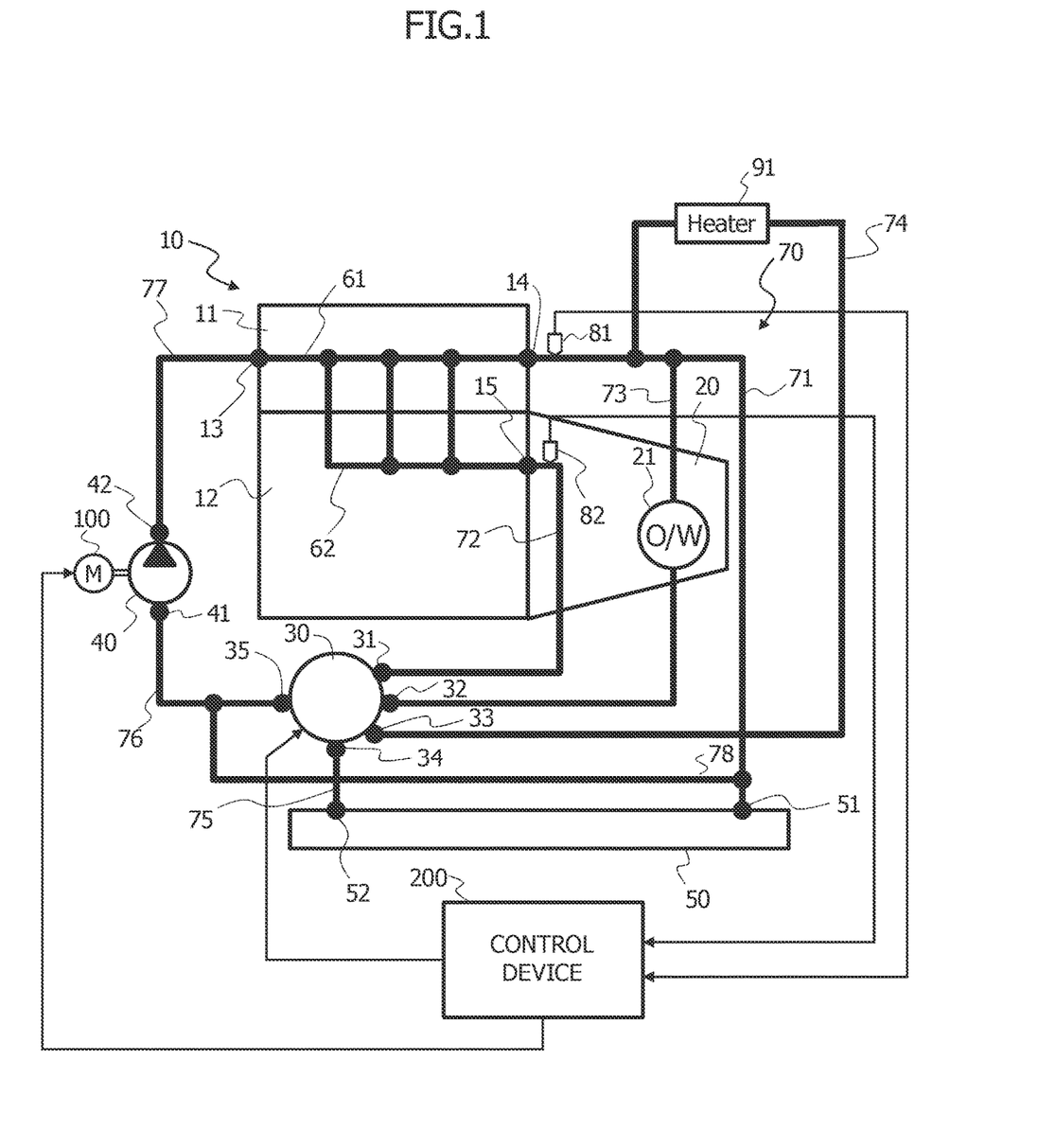
FIG. 1 is a schematic configuration diagram illustrating a cooling system for a vehicle internal combustion engine.

FIG. 1 illustrates a schematic configuration of a cooling system for a vehicle internal combustion engine in a case in which the present invention is applied to a brushless motor of an electric water pump. The cooling system is a water-cooled cooling device causing cooling water to circulate through a circulation passage. The cooling system includes an electric water pump 40 driven by a brushless motor 100, and brushless motor 100 is driven under sensorless control by a control device 200 such as an ECU.

Based on an operation state of an internal combustion engine, for example, at cold start, at warm up, and at stoppage of the engine after warming up of a start and stop system, electric water pump 40 is driven by brushless motor 100 to cause the cooling water to circulate through different circulation passages depending on a heat generation state of an internal combustion engine 10. When brushless motor 100 is driven at extremely low rotation rate (for example, 100 r/min or less) under low-speed sensorless control, at stoppage of the engine after warming up, so-called pulse shift control in which switch timings of respective phases are optionally shifted is performed in order to detect phase voltages.

In other words, a transmission 20 such as a CVT (Continuously Variable Transmission) as an example of a power transmission device is connected to an output shaft of internal combustion engine 10, and output of transmission 20 is transmitted to drive wheels (not illustrated) of a vehicle.

The cooling system for internal combustion engine 10 includes a flow control valve 30, electric water pump 40 driven by brushless motor 100, a radiator 50, a cylinder head cooling water passage 61, a cylinder block cooling water passage 62, a heater core (Heater) 91, an oil warmer (O/W) 21 for transmission 20, pipes 70 connecting these components, and the like.

Cylinder head cooling water passage 61 of internal combustion engine 10 connects a cooling water inlet 13 provided at one end of cylinder head 11 in a cylinder arrangement direction and a cooling water outlet 14 provided at the other end of cylinder head 11 in the cylinder arrangement direction, and extends inside cylinder head 11.

Cylinder block cooling water passage 62 of internal combustion engine 10 branches from cylinder head cooling water passage 61 to a cylinder block 12, extends inside cylinder block 12, and is connected to a cooling water outlet 15 provided in cylinder block 12.

One end of a first cooling water pipe 71 is connected to cooling water outlet 14 of cylinder head 11, and the other end of first cooling water pipe 71 is connected to a cooling water inlet 51 of radiator 50.

On the other hand, one end of a second cooling water pipe 72 is connected to cooling water outlet 15 of cylinder block cooling water passage 62, and the other end of second cooling water pipe 72 is connected to a first inlet port 31 of four inlet ports 31 to 34 of flow control valve 30.

Furthermore, one end of a third cooling water pipe 73 is connected to the middle of first cooling water pipe 71, and the other end of third cooling water pipe 73 is connected to second inlet port 32 of flow control valve 30. Oil warmer 21 adjusting a temperature of hydraulic oil of transmission 20 is provided in the middle of third cooling water pipe 73.

Furthermore, one end of a fourth cooling water pipe 74 is connected to first cooling water pipe 71 between cooling water outlet 14 and a connection point of third cooling water pipe 73, and the other end of fourth cooling water pipe 74 is connected to third inlet port 33 of flow control valve 30. Fourth cooling water pipe 74 is provided with various kinds of heat exchange devices such as heater core 91 heating conditioned air in a vehicle air conditioner.

One end of a fifth cooling water pipe 75 is connected to a cooling water outlet 52 of radiator 50, and the other end of fifth cooling water pipe 75 is connected to fourth inlet port 34 of flow control valve 30.

Flow control valve 30 includes one outlet port 35. One end of a sixth cooling water pipe 76 is connected to outlet port 35, and the other end of sixth cooling water pipe 76 is connected to a suction port 41 of electric water pump 40.

One end of seventh cooling water pipe 77 is connected to a discharge port 42 of electric water pump 40, and the other end of seventh cooling water pipe 77 is connected to cooling water inlet 13 of cylinder head 11.

One end of an eighth cooling water pipe 78 is connected to first cooling water pipe 71 on a downstream side of the connection point of third cooling water pipe 73 and a connection point of fourth cooling water pipe 74, and the other end of eighth cooling water pipe 78 is connected to sixth cooling water pipe 76.

As described above, flow control valve 30 includes four inlet ports 31 to 34 and one outlet port 35. Cooling water pipes 72, 73, 74, and 75 are respectively connected to inlet ports 31 to 34. Flow control valve 30 adjusts an amount of cooling water circulating through cooling water pipes 72, 73, 74, and 75 (cooling water circulation lines) by controlling an opening area of each of cooling water pipes 72, 73, 74, and 75 (outlet area of each of cooling water circulation lines).

Note that, even if all of inlet ports 31 to 34 of flow control valve 30 are closed, eighth cooling water pipe 78 can cause the cooling water having passed through cylinder head cooling water passage 61 to circulate by bypassing radiator 50.

Electric water pump 40 (brushless motor 100) and flow control valve 30 described above are controlled by control device 200.

Control device 200 controls a discharge flow rate of electric water pump 40 (rotation speed of brushless motor 100), and opening areas of respective inlet ports 31 to 34 of flow control valve 30 based on cooling water temperature information of internal combustion engine 10 detected by water temperature sensors 81 and 82, and the like. Note that, for example, water temperature sensor 82 of water temperature sensors 81 and 82 can be omitted, and the configuration is not limited to the configuration including two water temperature sensors.

For example, at cold start when the cooling water temperature of internal combustion engine 10 is less than a cold engine determination threshold, control device 200 controls flow control valve 30 so as to close all of inlet ports 31 to 34, and controls the rotation speed of electric water pump 40 (brushless motor 100) to an extremely low rotation speed (for example, about 100 r/min to about 200 r/min).

In other words, at cold start of internal combustion engine 10, the cooling water having flowed into cylinder head 11 (cylinder head cooling water passage 61) circulates without passing through other heat exchange devices including radiator 50, and a circulation rate of the cooling water is minimized. As a result, temperature rise of cylinder head 11 is promoted, and variation in temperature in the cooling water circulation passage is suppressed.

Thereafter, control device 200 opens inlet ports 31 to 34 and increases the rotation speed of electric water pump 40 (brushless motor 100) with rise of the cooling water temperature of internal combustion engine 10, thereby maintaining the cooling water temperature within a proper temperature range.

In a case in which internal combustion engine 10 is stopped by the start and stop system or the like in a warmed-up state, pulse shift control is performed. Electric water pump 40 (brushless motor 100) is driven at the extremely low rotation speed (for example, 100 r/min or less), and is reduced in flow rate. Even during stoppage of internal combustion engine 10, the cooling water circulates through the cylinder head 11 to suppress temperature rise.

In this case, the cooling water having flowed into cylinder head cooling water passage 61 circulates through the other heat exchange devices including radiator 50, thereby slowly cooling cylinder head 11. As a result, in a case in which internal combustion engine 10 is stopped after warming up, occurrence of a hot spot where only the cooling water temperature in the engine and the vicinity thereof, in particular, in cylinder head 11 rises is suppressed, which makes it possible to make the cooling water uniform in temperature and to suppress abnormal combustion at restart. In addition, since electric water pump 40 is driven at the extremely low rotation speed, it is possible to prevent cylinder head 11 from being excessively cooled or to prevent power consumption from being increased.

In a case in which electric water pump 40 is driven at the extremely low rotation speed at the time when the flow path of the cooling water is switched by flow control valve 30, a flow path resistance may be suddenly varied. At this time, since brushless motor 100 rotates at the extremely low speed, torque is small, and if a load is suddenly increased, step-out may occur. Therefore, frequency of position measurement is preferably increased when the flow path of the cooling water is switched.

Figure 2:
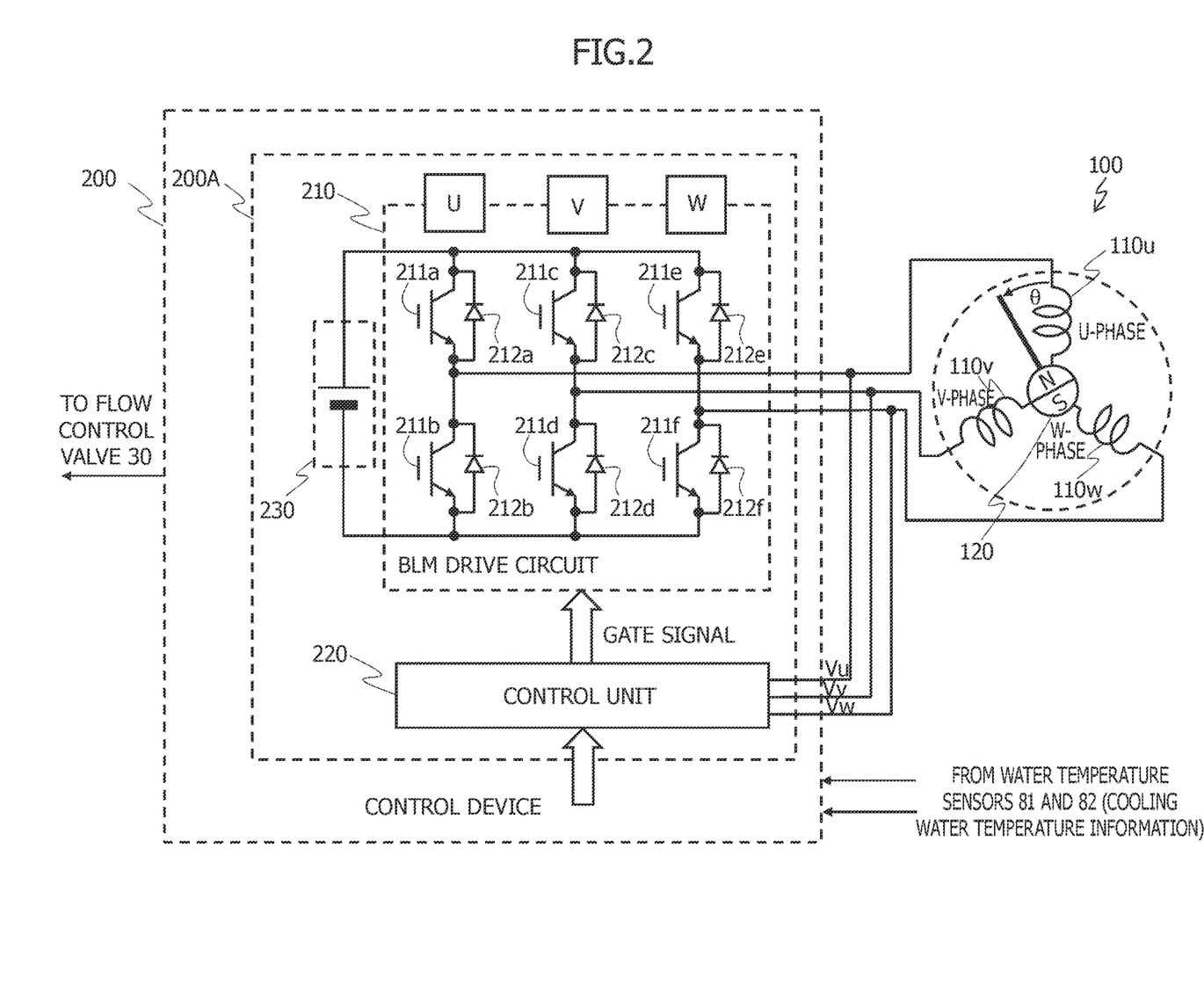
FIG. 2 is a circuit diagram of a motor drive device and a brushless motor according to an embodiment of the present invention.

FIG. 2 is a circuit diagram of configuration examples of brushless motor 100 as a driving source of electric water pump 40 and a drive device 200A of brushless motor 100 in control device 200.

Drive device 200A that drives and controls brushless motor 100 includes a motor drive circuit (BLM drive circuit) 210, a control unit 220, and a power supply circuit (battery) 230. Control unit 220 includes a microcomputer including an A/D converter, a microprocessor (CPU or MPU), and the like.

Brushless motor 100 is a three-phase DC brushless motor, and includes star-connected three-phase windings 110$u$, 110$v$, and 110$w$ of U-phase, V-phase, and W-phase in a cylindrical stator (not shown). A permanent magnet rotor (rotor) 120 is rotatably provided in a space formed at a center of the stator.

Motor drive circuit 210 includes an inverter circuit in which switching elements 211$a$ to 211$f$ are three-phase bridge-connected. Each of switching elements 211$a$ to 211$f$ is configured by an IGBT (Insulated Gate Bipolar Transistor) in this example, but may be another semiconductor element for power control, such as an FET (Field Effect Transistor). A cathode and an anode of each of diodes 212$a$ to 212$f$ are connected so as to be reversed in an energization direction, between a collector and an emitter of the corresponding IGBT.

Control terminals (gate terminals) of switching elements 211$a$ to 211$f$ are connected to control unit 220, and control unit 220 controls turning on and off of each of switching elements 211$a$ to 211$f$ by triangular-wave comparison PWM, thereby controlling a voltage (motor input voltage) applied to brushless motor 100.

In triangular-wave comparison PWM control, control unit 220 detects the on and off timings of switching elements 211$a$ to 211$f$ by comparing a triangular wave (carrier) with a PWM timer (PWM duty) set based on an instruction duty ratio (instruction pulse width).

The value of the PWM timer is set to a larger value as the duty ratio is larger. The PWM timer is set to a maximum value when the duty ratio is 100%, and the PWM timer is set to a minimum value (zero) when the duty ratio is 0%.

Brushless motor 100 does not include a sensor detecting positional information on rotor 120. Control unit 220 drives and controls brushless motor 100 by sensorless drive method not using the sensor detecting the positional information on rotor 120. Furthermore, control unit 220 switches the sensorless drive method between a sine-wave drive method and a square-wave drive method based on a motor rotation speed.

The sine-wave drive method is a method to drive brushless motor 100 by applying a sine-wave voltage to each phase of three-phase windings 110$u$, 110$v$, and 110$w$.

In the sine-wave drive method, control unit 220 acquires the positional information on rotor 120 from an induced voltage (speed electromotive force) generated by rotation of rotor 120. In addition, during a period when the position of the rotor is detected by the speed electromotive force, control unit 220 estimates the position of the rotor based on the motor rotation speed, calculates a three-phase output set value from the estimated position of the rotor and the PWM duty, controls a direction and intensity of a current based on a difference between interphase voltages, thereby causing a three-phase alternating current to flow through each phase.

Note that control unit 220 calculates the motor rotation speed based on a detection period of the position of the rotor.

The square-wave drive method is a method to drive brushless motor 100 by sequentially switching a selection pattern (energization mode) of two phases to which a pulsed voltage is applied among the three phases, for each predetermined position of the rotor.

In the square-wave drive method, control unit 220 acquires the positional information on rotor 120 by comparing a voltage (transformer electromotive force) induced in a non-energized phase (open phase) by application of the pulsed voltage to energized phases, with a threshold, and detects a switching timing of the energization mode that is the selection pattern of the energized phases based on such positional information.

The speed electromotive force detected for position detection in the sine-wave drive method is reduced in output level with decrease of the motor rotation speed, and position detection accuracy is lowered in a low rotation rate range. On the other hand, the induced voltage detected for position detection in the square-wave drive method is detectable even in the low rotation rate range including a motor stopped state, and the position detection accuracy can be maintained even in the low rotation rate range.

Therefore, control unit 220 controls brushless motor 100 by the sine-wave drive method in a high rotation range in which the positional information can be detected with sufficient accuracy by the square-wave drive method, that is, in a range in which the motor rotation speed is higher than the set value, whereas control unit 220 controls brushless motor 100 by the square-wave drive method in the low rotation rate range in which the positional information cannot be detected with sufficient accuracy by the sine-wave drive method.

Note that the low rotation rate range in which the positional information cannot be detected with sufficient accuracy by the sine-wave drive method includes a range in which the motor rotation speed is lower than the set value, and a range at start of brushless motor 100.

Furthermore, in the PWM control of brushless motor 100, control unit 220 determines the duty ratio of the PWM control based on, for example, a deviation between the detected value of the motor rotation speed and a target motor rotation speed (rotation speed instruction value), and brings an actual motor rotation speed close to the target motor rotation speed.

Figure 3:
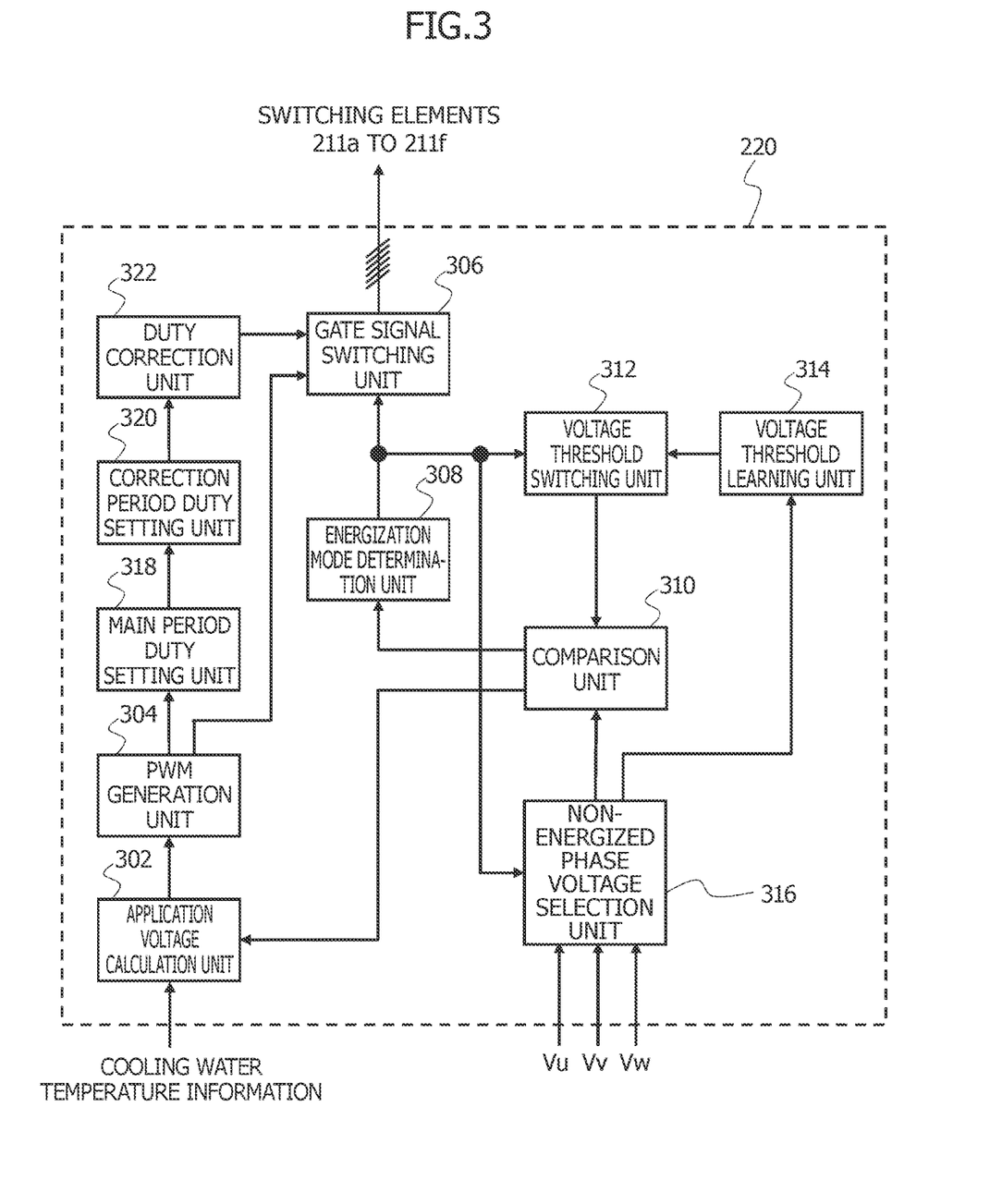
FIG. 3 is a functional block diagram illustrating components relating to low-speed sensorless control, of a control unit in FIG. 2.

FIG. 3 is a functional block diagram illustrating components relating to the low-speed sensorless control, of control unit 220.

Control unit 220 includes an application voltage calculation unit 302, a PWM generation unit 304, a gate signal switching unit 306, an energization mode determination unit 308, a comparison unit 310, a voltage threshold switching unit 312, a voltage threshold learning unit 314, a non-energized phase voltage selection unit 316, a main period duty setting unit 318, a correction period duty setting unit 320, a duty correction unit 322, and the like.

The cooling water temperature information of internal combustion engine 10 detected by water temperature sensors 81 and 82 is input to application voltage calculation unit 302. Application voltage calculation unit 302 calculates the target rotation speed and the motor rotation speed of brushless motor 100 based on the cooling water temperature information and a mode switching trigger signal output from comparison unit 310, and calculates an instruction value of an application voltage based on the calculated target rotation speed and the calculated motor rotation speed.

PWM generation unit 304 generates a pulse-width modulated PWM signal based on the instruction value of the application voltage calculated by application voltage calculation unit 302.

Energization mode determination unit 308 is a device outputting a mode instruction signal to determine the energization mode of motor drive circuit 210, and switches the energization mode in six ways with the mode switching trigger signal output from comparison unit 310 as a trigger.

The energization mode is a selection pattern of two phases to which the pulsed voltage is applied among the three phases of the U-phase, the V-phase, and the W-phase of brushless motor 100. There are six types of energization modes, namely, a first energization mode M1 in which a current flows from the U-phase to the V-phase, a second energization mode M2 in which a current flows from the U-phase to the W-phase, a third energization mode M3 in which a current flows from the V-phase to the W-phase, a fourth energization mode M4 in which a current flows from the V-phase to the U-phase, a fifth energization mode M5 in which a current flows from the W-phase to the U-phase, and a sixth energization mode M6 in which a current flows from the W-phase to the V-phase.

Energization mode determination unit 308 outputs the mode instruction signal instructing any one of first energization mode M1 to sixth energization mode M6, based on the mode switching trigger signal output from comparison unit 310.

Gate signal switching unit 306 determines switching operation for each of switching elements 211a to 211f of motor drive circuit 210, based on the mode instruction signal that is output of energization mode determination unit 308 and the PWM signal generated by PWM generation unit 304, and outputs six gate pulse signals to motor drive circuit 210 based on the determination.

Voltage threshold switching unit 312 sequentially switches and outputs a voltage threshold used for detection of the switching timing of the energization mode, based on the energization mode. A switching timing of the threshold is determined based on the mode instruction signal that is output of energization mode determination unit 308.

Non-energized phase voltage selection unit 316 selects the detected value of the voltage of the non-energized phase from three-phase terminal voltages Vu, Vv, and Vw of brushless motor 100 based on the mode instruction signal, and outputs the selected detected value to comparison unit 310 and voltage threshold learning unit 314.

Strictly speaking, the terminal voltage of the non-energized phase is a voltage between a ground (GND) and the terminal; however, in the present embodiment, a voltage at a neutral point is detected or the voltage at the neutral point is regarded as ½ of a power supply voltage VB, a difference (namely, phase voltage) between the voltage at the neutral point and the voltage between the ground (GND) and the terminal is determined and handled as the terminal voltage of the non-energized phase.

Comparison unit 310 compares the threshold output from voltage threshold switching unit 312 with the detected value of the voltage (detected value of pulse induced voltage) of the non-energized phase output from non-energized phase voltage selection unit 316, to detect the switching timing of the energization mode, namely, whether the rotor is at the position (magnetic pole position) at which the energization mode is switched, and outputs the mode switching trigger to energization mode determination unit 308 when the switching timing is detected.

Voltage threshold learning unit 314 is a device updating and storing a threshold used for determination of the switching timing of the energization mode.

The pulse induced voltage of the non-energized phase (open phase) is varied due to manufacturing variation of brushless motor 100, detection variation of a voltage detection circuit, or the like. Therefore, when a fixed value is used as the threshold, the switching timing of the energization mode may be erroneously determined.

Therefore, voltage threshold learning unit 314 detects the pulse induced voltage at a predetermined magnetic pole position at which the energization mode is switched, and performs threshold learning processing for correcting the threshold stored in voltage threshold switching unit 312, based on a result of the detection.

There are six energization modes M1 to M6 as described above. Control unit 220 sequentially switches energization modes M1 to M6 at switching angle positions set at 60-degree intervals of an electric angle, and sequentially switching the two phases to which the pulsed voltage is applied among the three phases of brushless motor 100, thereby rotationally driving brushless motor 100.

Figure 4:
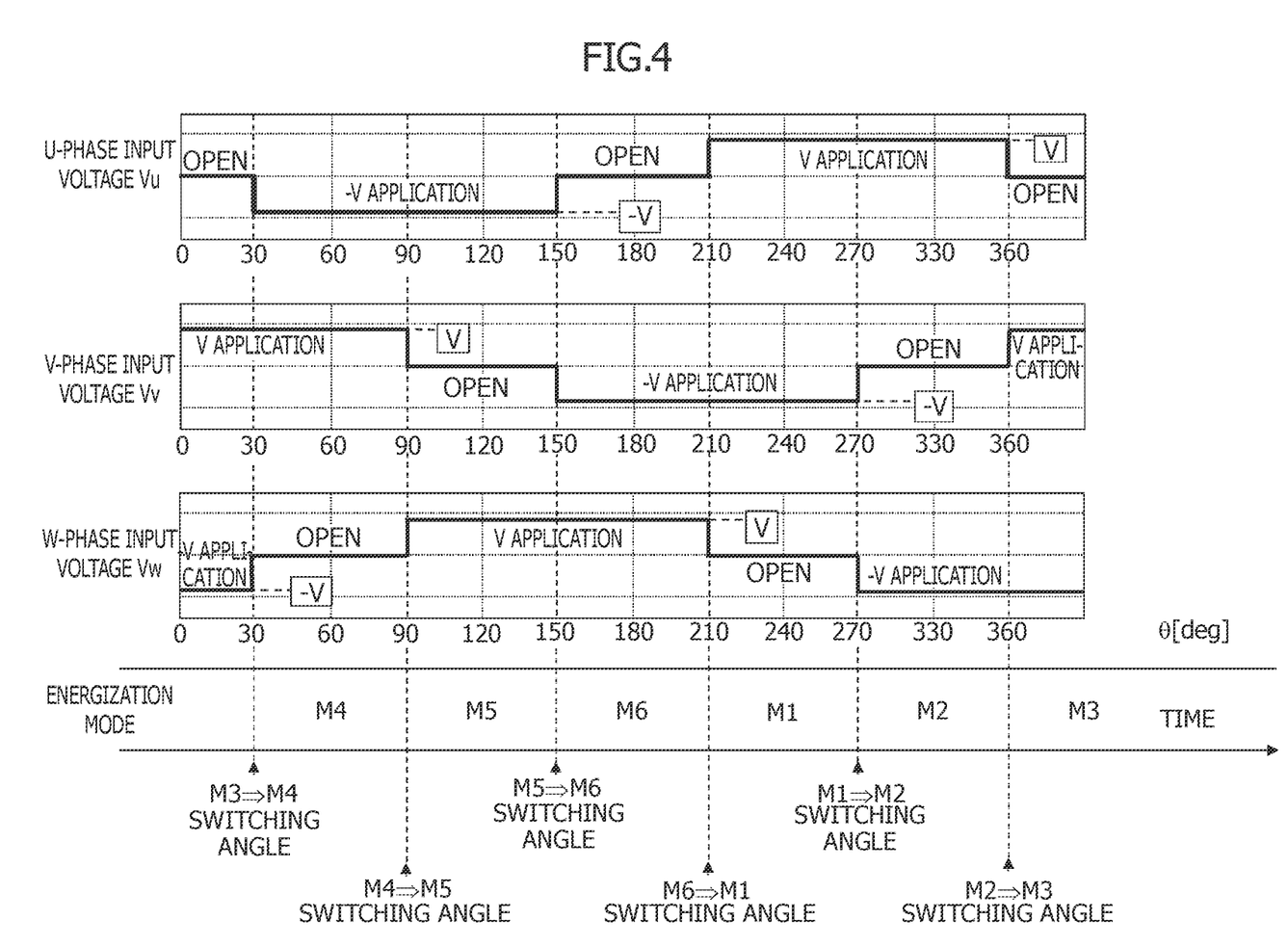
FIG. 4 is a time chart illustrating examples of three-phase input voltages in a 120-degree energization system of the brushless motor.

In a case in which an angular position of U-phase winding 110u is assumed to be a reference position (angle=0 degrees) of rotor (magnetic pole) 120, control unit 220 switches the energization mode from third energization mode M3 to fourth energization mode M4 when the angular position (magnetic pole position θ) of rotor 120 is 30 degrees, as illustrated in FIG. 4. When the angular position of the rotor is 90 degrees, control unit 220 switches the energization mode from fourth energization mode M4 to fifth energization mode M5. When the angular position of the rotor is 150 degrees, control unit 220 switches the energization mode from fifth energization mode M5 to sixth energization mode M6. When the angular position of the rotor is 210 degrees, control unit 220 switches the energization mode from sixth energization mode M6 to first energization mode M1. When the angular position of the rotor is 270 degrees, control unit 220 switches the energization mode from first energization mode M1 to second energization mode M2. When the angular position of the rotor is 330 degrees, control unit 220 switches the energization mode from second energization mode M2 to third energization mode M3.

Voltage threshold switching unit 312 of control unit 220 stores the induced voltages (transformer electromotive forces) of the non-energized phase at the respective angular positions of rotor 120 at which the energization mode is switched, as the updatable thresholds, and outputs the threshold corresponding to the energization mode at that time.

When the induced voltage of the non-energized phase reaches the threshold, comparison unit 310 outputs a signal indicating that the angle at which switching to the next energization mode is performed has been detected, and energization mode determination unit 308 switches the energization mode based on the output signal.

Furthermore, for example, in first energization mode M1 in which the current flows from the U-phase to the V-phase, control unit 220 (gate signal switching unit 306) performs complementary PWM control on an on-off ratio of upper switching element 211c of the V-phase (upper arm of V-phase) and lower switching element 211d of the V-phase (lower arm of V-phase) while turns on upper switching element 211a of the U-phase (upper arm of U-phase), thereby variably controlling an average application voltage of the U-phase and the V-phase through which the current flows, based on the PWM duty.

At this time, for example, in first energization mode M1, control unit 220 (gate signal switching unit 306) turns off switching elements 211b, 211e, and 211f other than upper switching element 211a of the U-phase, upper switching element 211c of the V-phase, and lower switching element 211d of the V-phase.

Note that control unit 220 (gate signal switching unit 306) performs the PWM control for turning on and off of the switching element of the upper arm and the switching element of the lower arm of the downstream phase, by complementary control method in the energization mode other than first energization mode M1.

Figure 5:
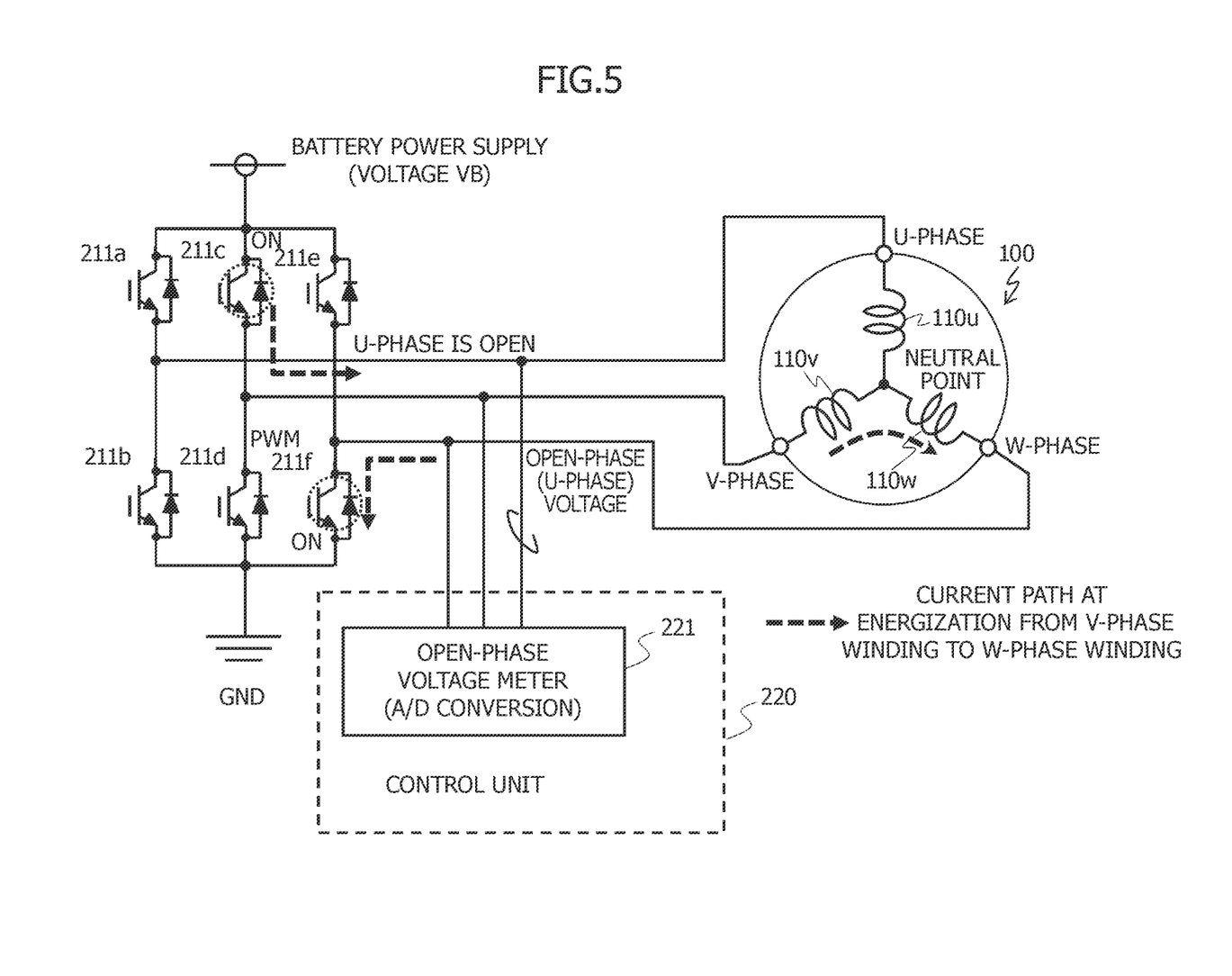
FIG. 5 is a circuit diagram to explain the low-speed sensorless control of the brushless motor.

FIG. 5 illustrates a current path at the time of energization from the V-phase winding to the W-phase winding. When switching elements 211c and 211f are turned on and switching elements 211a, 211b, 211d, and 211e are turned off, a current flows from the battery power supply (voltage VB) to the ground (GND) through a collector and an emitter of switching element 211c, V-phase winding 110v, the neutral point, W-phase winding 110w, and a collector and an emitter of switching element 211f The open-phase (U-phase) voltage at this time is detected by an open-phase voltage meter 221, and the detected voltage is A/D converted to estimate the positional information on rotor 120. Furthermore, control unit 220 performs energization by the PWM control, and drives brushless motor 100 at the extremely low rotation speed.

To perform energization from the W-phase winding to the V-phase winding, switching elements 211e and 211d are turned on, and switching elements 211a, 211b, 211c, and 211f are turned off. As a result, a current flows from the battery power supply (voltage VB) to the ground (GND) through a collector and an emitter of switching element 211e, W-phase winding 110w, the neutral point, V-phase winding 110v, and a collector and an emitter of switching element 211d.

Figure 6:
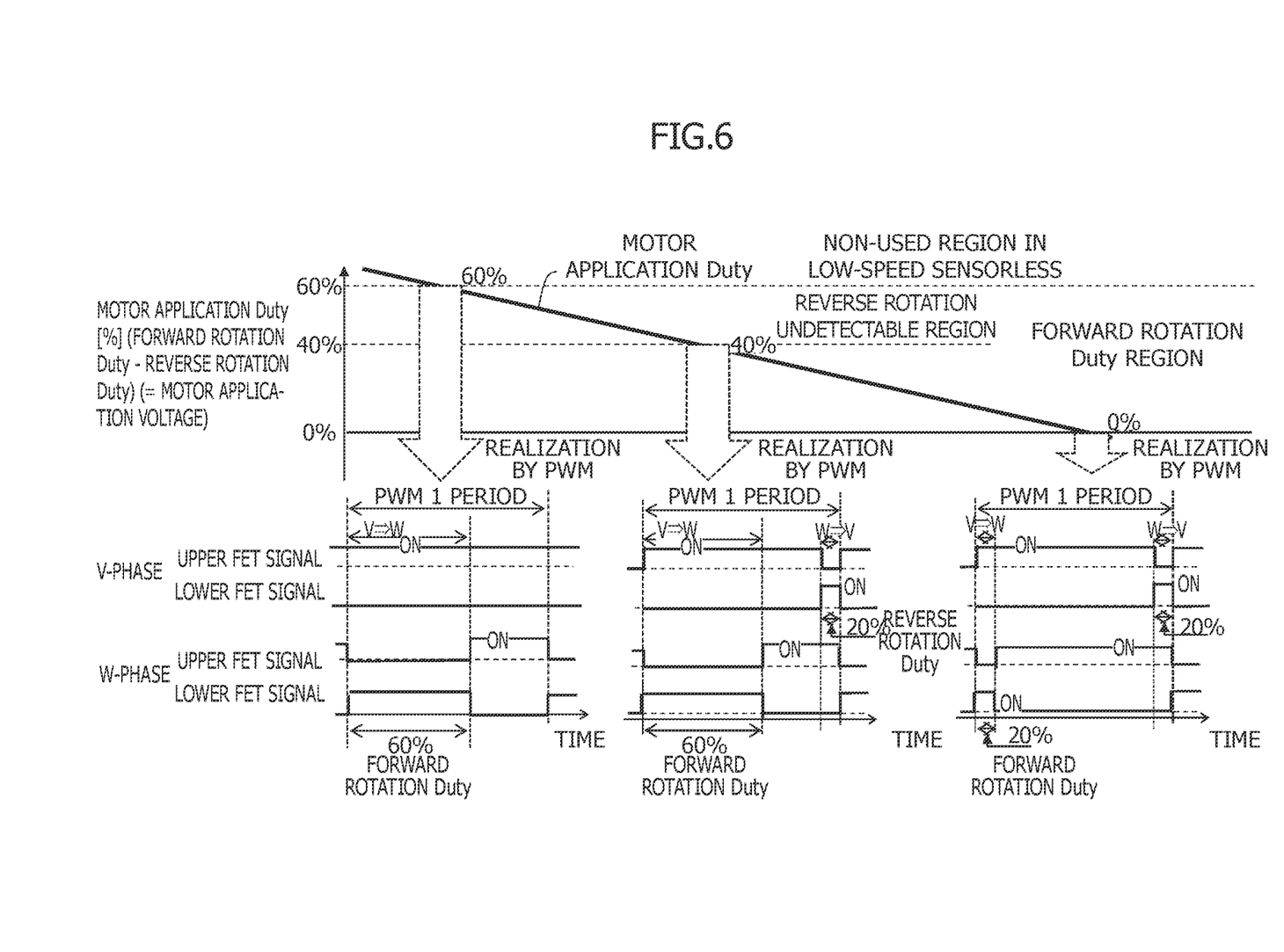
FIG. 6 is a diagram to explain a motor application duty in a drive device of the brushless motor according to the embodiment of the present invention.

FIG. 6 illustrates a motor application duty (Duty) in the drive device of the brushless motor according to the embodiment of the present invention. Here, a case in which, as illustrated in FIG. 5, energization is performed from V-phase winding 110v to W-phase winding 110w (forward rotation duty) and then energization is performed from W-phase winding 110w to V-phase winding 110v (reverse rotation duty) in one period of the PWM control is described as an example.

In stationary driving at the extremely low rotation speed (100 r/min), reverse rotation may occur due to contamination, in the brushless motor for the electric water pump used in the cooling system for the vehicle internal combustion engine.

When the motor application duty is increased, a reverse rotation detection duty width cannot be secured. Therefore, in a case in which reverse rotation occurs, the reverse rotation may not be detected, and step-out may occur. To prevent step-out during the extremely low rotation rate, it is necessary to limit a duty width Dw necessary for acquisition of a magnetic saturation voltage so as to satisfy "Dmin≤Dw≤Dmax" as described above.

In the present embodiment, under such a precondition, a duty (switching duty) at which detection and non-detection of reverse rotation of the brushless motor are switched is set, and in a case in which torque exceeding torque when "motor application duty switching duty" is established is necessary, the motor application duty is determined based on the motor rotation speed.

In the example illustrated in FIG. 6, the motor application duty is limited to 60% at a maximum, and is limited to 40% at a minimum. As described above, since the maximum duty is limited to 60%, the reverse rotation detection duty of only up to 40% is applicable as an input duty to the motor (duty applied to motor is 60%−20%=40%).

In one period of the PWM control, first, upper switching element 211c of the V-phase is tuned on, lower switching element 211d of the V-phase is turned off, upper switching element 211e of the W-phase is turned off, and lower switching element 211f of the W-phase is turned on, to perform the energization from the V-phase to the W-phase. In other words, a positive pulse generating torque in the rotation direction of the brushless motor is applied to the brushless motor. Subsequently, upper switching element 211c of the V-phase is turned off, lower switching element 211d of the V-phase is turned on, upper switching element 211e of the W-phase is turned on, and lower switching element 211f of the W-phase is turned off, to perform the energization from the W-phase to the V-phase. In other words, a negative pulse generating torque in a reverse rotation direction of the brushless motor is applied to the brushless motor.

When the forward rotation duty in a direction of the energization from the V-phase to the W-phase is set to 20%, and the reverse rotation duty in a direction of the energization from the W-phase to the V-phase is set to 20%, the motor application duty is 0%.

Likewise, when the forward rotation duty in the direction of the energization from the V-phase to the W-phase is set to 60%, and the reverse rotation duty in the direction of the energization from the W-phase to the V-phase is set to 20% in one period of the PWM control, the motor application duty is 40%.

Furthermore, when the forward rotation duty in the direction of the energization from the V-phase to the W-phase is set to 60%, and the reverse rotation duty in the direction of the energization from the W-phase to the V-phase is set to 0% in one period of the PWM control, the motor application duty is 60% at a maximum.

As described above, in a case in which the motor application duty calculated by "maximum duty−minimum duty" is handled as the upper limit value of the switching duty for detection and non-detection of the reverse rotation, and there is no possibility of the reverse rotation at the upper limit value (motor rotation speed is high), the motor application duty is increased and detection of the reverse rotation is not performed. In a case in which there is a possibility of the reverse rotation due to load torque (motor rotation speed is low), "motor application duty=upper limit value" is hold. As a result, step-out does not occur even if reverse rotation occurs.

Note that, during the processing of the upper limit value, it is preferable to hold a calculation value by an integrator (I) that is a component of rotation speed feedback (FB) control, and to skip calculation update.

Figure 7:
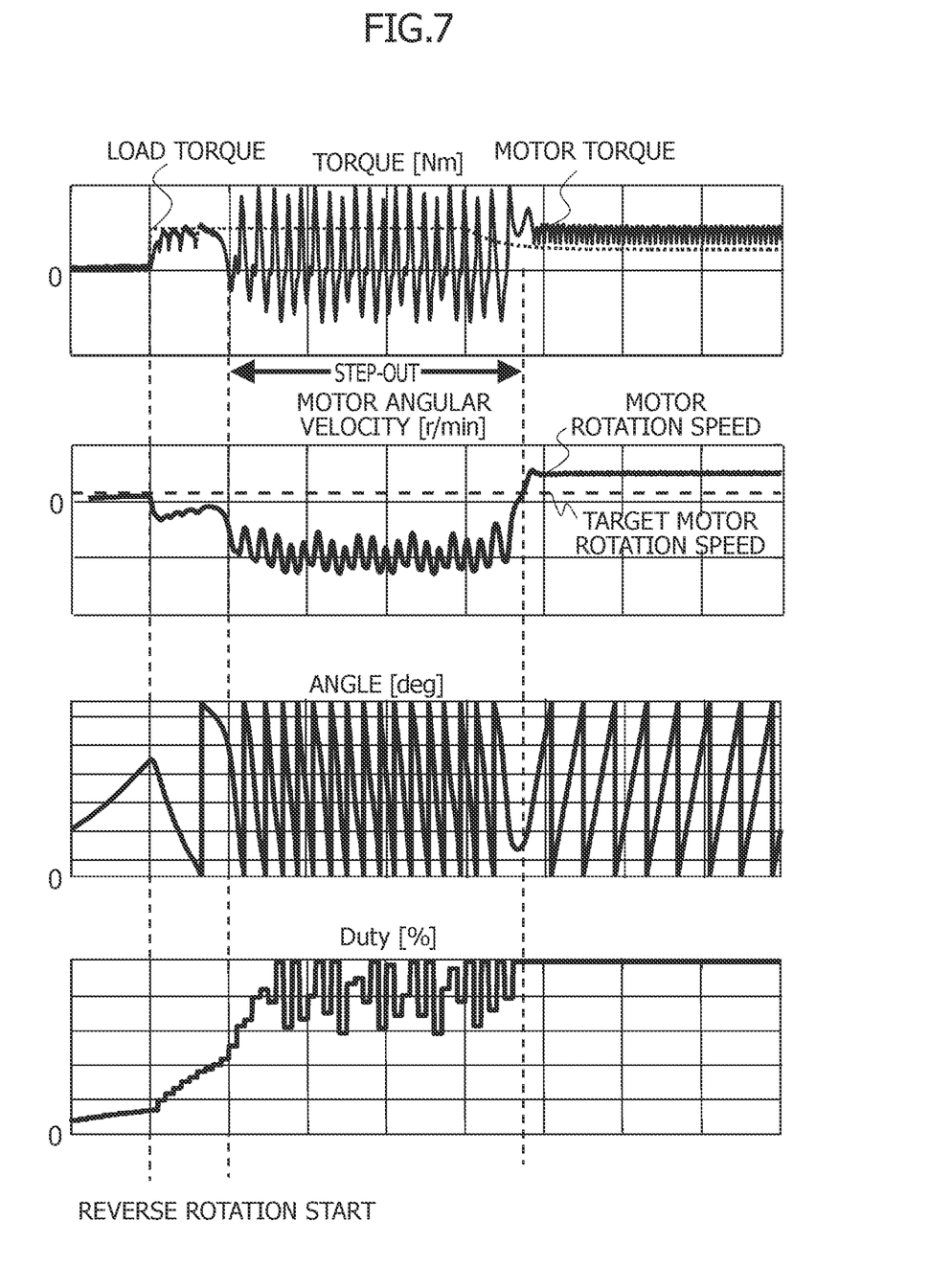
FIG. 7 is a waveform diagram illustrating simulation results of torque of a motor, an angular velocity of the motor, an angle of the motor, and a motor application duty in existing low-speed sensorless control.
Figure 8:
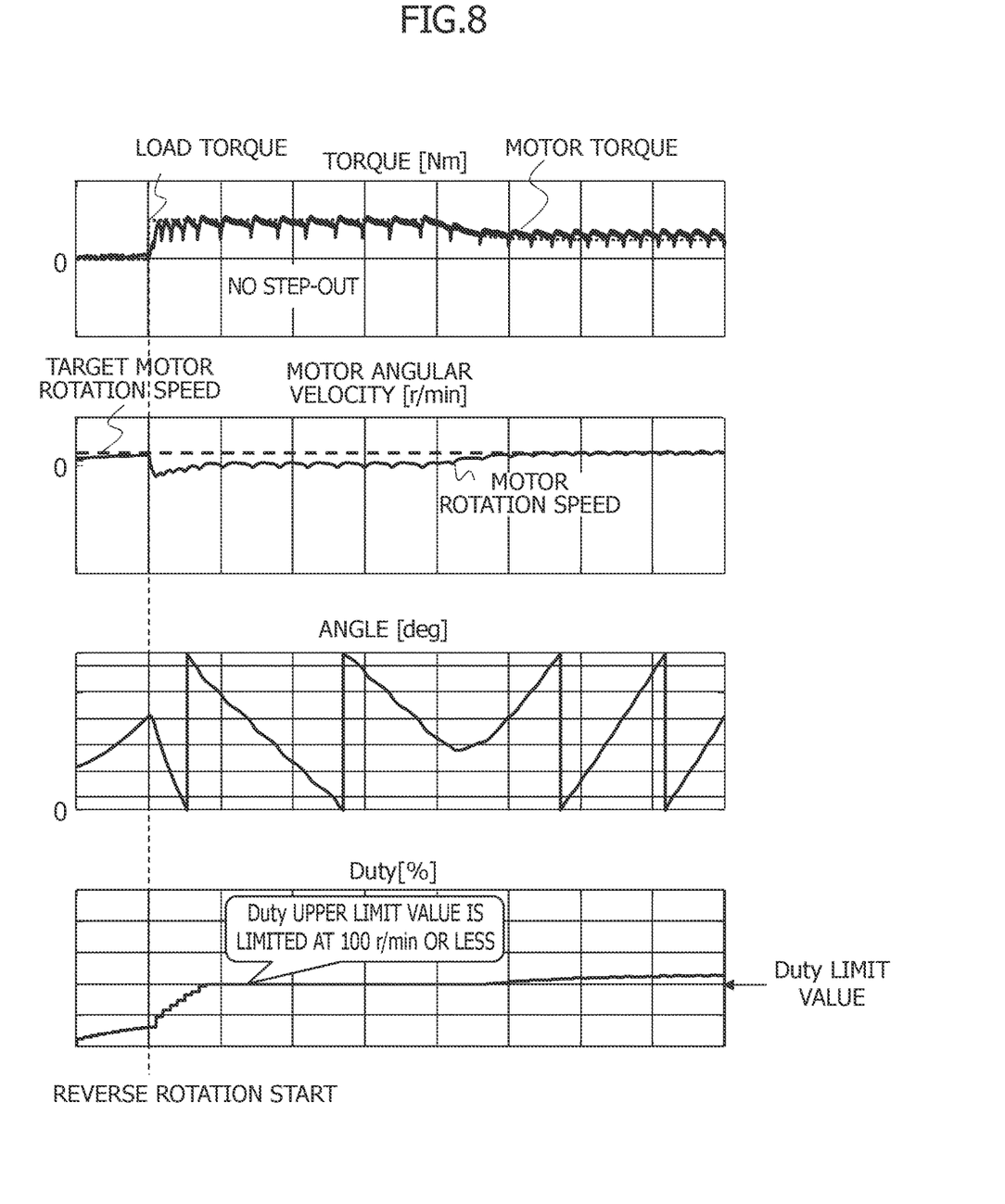
FIG. 8 is a waveform diagram illustrating simulation results of torque of the motor, an angular velocity of the motor, an angle of the motor, and the motor application duty in the low-speed sensorless control according to the present invention.

FIG. 7 and FIG. 8 illustrate simulation results of torque of the motor, an angular velocity of the motor, an angle of the motor, and the motor application duty in existing low-speed sensorless control (before measures) and in the low-speed sensorless control according to the present invention (after measures). In the existing low-speed sensorless control, for example, when the duty is 40% or more with respect to the target motor rotation speed of 300 r/min, the reverse rotation cannot be detected, and step-out accordingly occurs.

In contrast, in the present invention, the motor rotation angle can be recognized by limiting the duty upper limit value to, for example, 40% at the extremely low rotation rate (for example, 100 r/min). Therefore, even if the motor reversely rotates, step-out does not occur.

As described above, it is confirmed that suppressing step-out makes it possible to recognize the accurate angular information by using the motor angular information.

As described above, according to the present invention, the duty at which detection and non-detection of reverse rotation are switched is set, and in a case in which torque exceeding torque when the motor application duty is greater than or equal to the set duty is necessary, the motor application duty is determined based on the rotation speed. Therefore, even if reverse rotation occurs in the low-speed sensorless control, occurrence of step-out can be suppressed.

Technical ideas that can be understood from the above-described embodiment are described below.

According to one aspect, a brushless motor control device applies, to a brushless motor, a positive pulse generating torque in a rotation direction of the brushless motor and a negative pulse generating torque in a reverse rotation direction, and detects a rotation direction by using a magnetic saturation voltage generated when the positive and negative pulses are applied. The brushless motor control device sets an upper limit value to a motor application duty represented by a value obtained by subtracting an application duty of the negative pulse from an application duty of the positive pulse.

In a preferred aspect, the upper limit value is a duty at which detection and non-detection of reverse rotation are switched, and the upper limit value is a duty less than or equal to a duty represented by a difference between an upper limit duty and a lower limit duty at which the magnetic saturation voltage is detectable.

Furthermore, in a preferred aspect, in a case in which a rotation speed of the brushless motor is less than a predetermined value, upper limit value processing is performed. During the upper limit value processing, a calculation value of an integrator that is a component of rotation speed feedback control is held, and calculation update is not performed.

The upper limit value processing can be determined from a slope of the magnetic saturation voltage, in place of comparison of the motor rotation speed with the predetermined value.

Furthermore, in a preferred aspect, the predetermined value to be compared with the rotation speed of the brushless motor is set to a rotation speed that is calculatable and updatable before a rotation speed polarity is switched even when load torque assumed in a system occurs and the rotation speed is reduced.

Furthermore, in a preferred aspect, the predetermined value is a rotation speed of the brushless motor at which it is assumed that reverse rotation does not occur at a rotation speed greater than or equal to that rotation speed.

In a preferred aspect, a motor application duty represented by a value obtained by subtracting a minimum duty from a maximum duty is set to an upper limit value of a duty at which detection and non-detection of reverse rotation of the brushless motor are switched, and in a case in which a rotation speed of the brushless motor is high at the upper limit value, the motor application duty is increased and detection of reverse rotation is not performed, and in a case in which the rotation speed of the brushless motor is low, the motor application duty is held at the upper limit value.

According to one aspect, a brushless motor control method is a control method of applying, to a brushless motor, a positive pulse generating torque in a rotation direction of a brushless motor and a negative pulse generating torque in a reverse rotation direction, and detecting a rotation direction by using a magnetic saturation voltage generated when the positive and negative pulses are applied. The method includes setting an upper limit value to a motor application duty represented by a value obtained by subtracting an application duty of the negative pulse from an application duty of the positive pulse.

In a preferred aspect, the upper limit value is a duty at which detection and non-detection of reverse rotation of the brushless motor are switched, and the upper limit value is a duty less than or equal to a duty represented by a difference between an upper limit duty and a lower limit duty at which the magnetic saturation voltage is detectable.

The configurations described in the embodiment are merely schematically illustrated to an extent enabling the present invention to be understood and implemented. Therefore, the present invention is not limited to the described embodiment, and can be changed in various ways without departing from the scope of the technical ideas in the claims.

For example, in the embodiment, the brushless motor for the electric water pump used in the cooling system for the vehicle internal combustion engine is described as an example; however, the present invention is similarly applicable to the other brushless motor required to perform the extremely low rotation rate driving, for example, a brushless motor used for a next-generation brushless electric VTC system.

In the next-generation electric VTC, a VTC angle is calculated using a motor rotation angle in operation while the engine rotates at low speed. Therefore, if step-out of the motor occurs, the motor rotation angle becomes unclear, and the VTC angle also becomes unclear. Thus, suppression of step-out of the motor contributes to improvement in reliability of the electric VTC.

REFERENCE SYMBOL LIST

10 Internal combustion engine
20 Transmission
30 Flow control valve
40 Electric water pump
100 Brushless motor (three-phase DC brushless motor)
110$u$, 110$v$, 110$w$ Three-phase winding
120 Permanent magnet rotor (rotor)
211$a$ to 211$f$ Switching element
200 Control device
200A Motor drive device
210 Motor drive circuit
220 Control unit

The invention claimed is:

1. An apparatus comprising:
a brushless motor control device applying, to a brushless motor, a positive pulse generating torque in a rotation direction of the brushless motor and a negative pulse generating torque in a reverse rotation direction, and determining a rotation direction by using a magnetic saturation voltage generated when the positive and negative pulses are applied, wherein
the brushless motor control device sets an upper limit value to a motor application duty represented by a value obtained by subtracting an application duty of the negative pulse applied to the brushless motor, from an application duty of the positive pulse.

2. The apparatus according to claim 1, wherein the upper limit value is a duty at which detection and non-detection of reverse rotation of the brushless motor are switched, and the upper limit value is a duty less than or equal to a duty represented by a difference between an upper limit duty and a lower limit duty at which the magnetic saturation voltage is detectable.

3. The apparatus according to claim 2, wherein, in a case in which a rotation speed of the brushless motor is less than a predetermined value, upper limit value processing is performed.

4. The apparatus according to claim 3, wherein the upper limit value processing is determined from a slope of the magnetic saturation voltage.

5. The apparatus according to claim 3, wherein the predetermined value to be compared with the rotation speed of the brushless motor is set to a rotation speed that is calculatable and updatable before a rotation speed polarity is switched even when load torque assumed in a system occurs and the rotation speed is reduced.

6. The apparatus according to claim 3, wherein the predetermined value is a rotation speed of the brushless motor at which it is assumed that reverse rotation does not occur at a rotation speed greater than or equal to that rotation speed.

7. The apparatus according to claim 1, wherein
a motor application duty represented by a value obtained by subtracting a minimum duty from a maximum duty is set to an upper limit value of a duty at which detection and non-detection of reverse rotation of the brushless motor are switched, and
in a case in which a rotation speed of the brushless motor is high at the upper limit value, the motor application duty is increased and detection of reverse rotation is not performed, and in a case in which the rotation speed of the brushless motor is low, the motor application duty is held at the upper limit value.

8. A method for controlling a brushless motor, comprising:
applying, to the brushless motor, a positive pulse generating torque in a rotation direction of a brushless motor and a negative pulse generating torque in a reverse rotation direction, and determining a rotation direction by using a magnetic saturation voltage generated when the positive and negative pulses are applied, the method comprising setting an upper limit value to a motor application duty represented by a value obtained by subtracting an application duty of the negative pulse from an application duty of the positive pulse.

9. The method according to claim 8, wherein the upper limit value is a duty at which detection and non-detection of reverse rotation of the brushless motor are switched, and the upper limit value is a duty less than or equal to a duty represented by a difference between an upper limit duty and a lower limit duty at which the magnetic saturation voltage is detectable.

10. The method according to claim 8, wherein
in a case of reverse rotation due to load torque the motor application duty is held as the upper limit value,
during processing of the upper limit value, a calculation value is held by an integrator that is a component of a rotation speed feedback control, and
in a case that the motor application duty is greater than or equal to the set duty, the motor application duty is determined based on the rotation speed.

11. An apparatus comprising:
a brushless motor control device applying, to a brushless motor, a positive pulse generating torque in a rotation direction of the brushless motor and a negative pulse generating torque in a reverse rotation direction, and determining a rotation direction by using a magnetic saturation voltage generated when the positive and negative pulses are applied, wherein
the brushless motor control device sets an upper limit value to a motor application duty represented by a value obtained by subtracting an application duty of the negative pulse applied to the brushless motor, from an application duty of the positive pulse,
in a case of reverse rotation due to load torque the motor application duty is held as the upper limit value,
during processing of the upper limit value, a calculation value is held by an integrator that is a component of a rotation speed feedback control, and
in a case that the motor application duty is greater than or equal to the set duty, the motor application duty is determined based on the rotation speed.

12. The apparatus according to claim 11, wherein the upper limit value is a duty at which detection and non-detection of reverse rotation of the brushless motor are switched, and the upper limit value is a duty less than or equal to a duty represented by a difference between an upper limit duty and a lower limit duty at which the magnetic saturation voltage is detectable.

13. The apparatus according to claim 12, wherein, in a case in which a rotation speed of the brushless motor is less than a predetermined value, upper limit value processing is performed.

14. The apparatus according to claim 13, wherein the upper limit value processing is determined from a slope of the magnetic saturation voltage.

15. The apparatus according to claim 13, wherein the predetermined value to be compared with the rotation speed of the brushless motor is set to a rotation speed that is calculatable and updatable before a rotation speed polarity is switched even when load torque assumed in a system occurs and the rotation speed is reduced.

16. The apparatus according to claim 13, wherein the predetermined value is a rotation speed of the brushless motor at which it is assumed that reverse rotation does not occur at a rotation speed greater than or equal to that rotation speed.

17. The apparatus according to claim 11, wherein
a motor application duty represented by a value obtained by subtracting a minimum duty from a maximum duty is set to an upper limit value of a duty at which detection and non-detection of reverse rotation of the brushless motor are switched, and
in a case in which a rotation speed of the brushless motor is high at the upper limit value, the motor application duty is increased and detection of reverse rotation is not performed, and in a case in which the rotation speed of the brushless motor is low, the motor application duty is held at the upper limit value.

* * * * *